Figure 1:
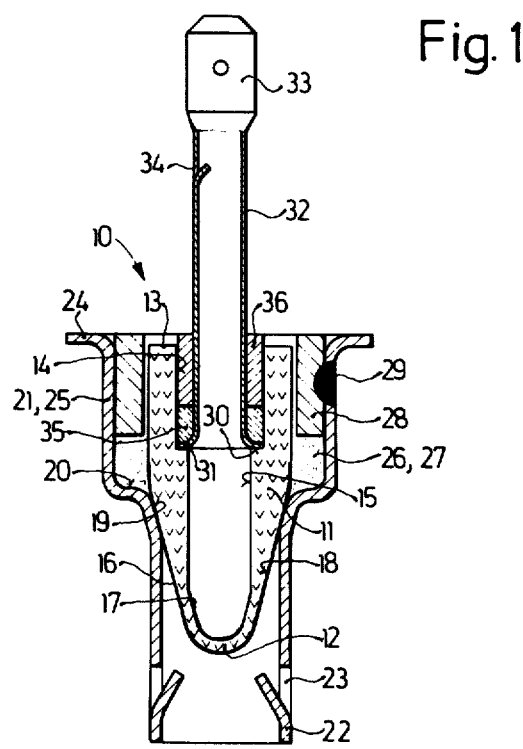

United States Patent [19]
Beesch

[11] 3,891,529
[45] June 24, 1975

[54] ELECTROCHEMICAL OXYGEN SENSOR, ESPECIALLY FOR MOTOR EXHAUST GAS ANALYSIS

[75] Inventor: Otto Beesch, Stuttgart, Germany

[73] Assignee: Robert Bosch G.m.b.H., Stuttgart, Germany

[22] Filed: Jan. 10, 1974

[21] Appl. No.: 432,248

[30] Foreign Application Priority Data
Jan. 30, 1973 Germany............................ 2304359

[52] U.S. Cl............................ 204/195 S; 123/119 E
[51] Int. Cl. ........................................... G01n 27/46
[58] Field of Search ........ 204/1 T, 195 S; 136/86 F; 60/258; 123/119 E

[56] References Cited
UNITED STATES PATENTS
| | | | |
|---|---|---|---|
| 3,546,086 | 12/1970 | Sayles | 204/195 S |
| 3,576,730 | 4/1971 | Spacil | 204/195 S |

Primary Examiner—T. Tung
Attorney, Agent, or Firm—William R. Woodward; Flynn & Frishauf

[57] ABSTRACT

Between a closed-end tube of solid electrolyte provided with platinum layer electrodes on its inner and outer surfaces and a surrounding sheet metal casing, a conducting powder seal of graphite or copper powder is compressed by a ring member, but retains sufficient yielding characteristic to relieve thermal stresses. When the seal is made of copper powder, its axial ends are protected by a layer of talc or graphite against oxidation. The seal between the inner platinum layer electrode and a connection member is provided with a fused conducting glass material likewise compressed by a ring. The outer electrode surface is exposed to the gas under test and the inner electrode surface is exposed to atmospheric oxygen. The sensor operates as an oxygen concentration cell providing an electric potential corresponding to the oxygen concentration ratio.

2 Claims, 2 Drawing Figures

ELECTROCHEMICAL OXYGEN SENSOR, ESPECIALLY FOR MOTOR EXHAUST GAS ANALYSIS

CROSS-REFERENCE TO RELATED APPLICATION:

U.S. Ser. No. 316,008, filed Dec. 18, 1972, Friese et al., now U.S. Pat. No. 3,841,987.

This invention relates to an electrochemical sensor for determining the oxygen content of exhaust gases, particularly the exhaust gases of combustion engines, in particular sensors of the type having a tube of solid electrolyte closed at one end that is capable of conducting ions, provided on its inner and outer surfaces with electron conducting layers respectively providing the electrodes for the device.

Devices of this type are designed to have one side of the solid electrolyte tube, for example the inner surface, exposed to atmospheric air, and the other side, the outer surface for example, exposed to the gas under examination for oxygen content. The outer surface is conveniently connected to a grounded casing that may be tightly inserted in the exhaust piping of an engine and the inner surface is connected to a terminal for connection to an electric circuit.

On account of the effects of widely varying temperature on such electrochemical sensors, if the components of the sensor have different thermal expansion coefficients, there is a risk of breakage of the solid electrolyte tube or of cracking or other leakage in the seal between the solid electrolyte tube and the casing. It has therefore already been proposed that the solid electrolyte tube should be connected to the housing by a thin layer of hard solder or a thin electrically conducting flux of a glass melt and that the casing should be made of an expensive nickel-iron-cobalt alloy in order to have a thermal expansion coefficient that corresponds somewhat to that of the solid electrolyte tube. Casings of such material are, however, very expensive and, besides, the sealing operations with hard solder or with a glassy material are troublesome to carry out as well as very expensive It is accordingly an object of the present invention to provide an electrochemical sensor utilizing cheaper materials for a casing and capable of production with simpler assembly procedures.

SUBJECT MATTER OF THE PRESENT INVENTION

Briefly, the seal between the solid electrolyte tube and the casing is made with a conducting material that has a yielding characteristic even after compression with a pressure-applying ring. A powdered conducting material provides such a characteristic and preferably the material is graphite powder or copper powder. When copper powder is used, it is preferably protected against oxidation by providing a layer talc powder at both ends of the seal.

A pressure-applying ring may also be used to compress the seal between the connection terminal and the inner surface of the solid electrolyte tube, but since the outer seal of powdered material is sufficient to relieve stresses, the inner seal may be made of a fused conducting glass material.

Figure 2:
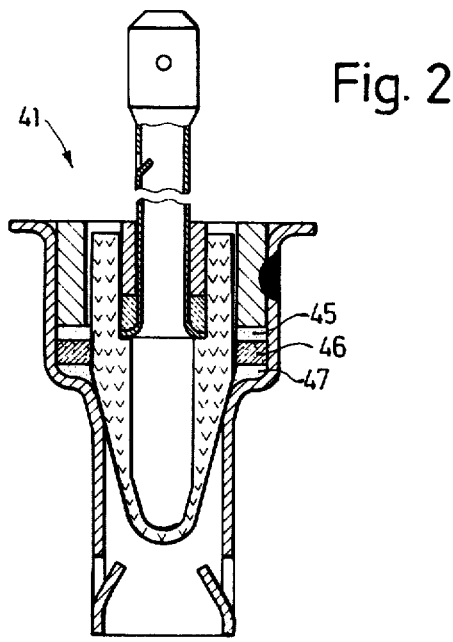

The invention will be described by way of example with reference to the accompanying drawings, wherein:

FIG. 1 is a longitudinal section through a sensor according to the invention having graphite powder as the sealing material, and FIG. 2 is a longitudinal section of a sensor according to the invention with a three-layer seal of talc-copper-talc or graphite-copper-talc.

The electrochemical sensor 10 shown in FIG. 1 is designed for mounting on the exhaust pipe of a combustion engine, so that it projects radially into the pipe. The sensor 10 has as its principal component a solid electrolyte tube 11 that is closed at one end 12 and has a cylindrical cavity 14 at its other end, which is prolonged into a longitudinal bore 15. The solid electrolyte tube 11 consists of stabilized cubic zircon dioxide and is provided with a platinum layer on its outer surface that serves as the outer electrode 16. The longitudinal bore 15 and its associated cavity 14 are provided with an inner electrode 17 that likewise consists of platinum and has the form of a conducting path. This inner platinum layer is produced by painting on a platinum suspension, followed by calcination.

The solid electrolyte tube 11 has a conically shaped surface 18 leading to its closed end 12 and the tube 11 rests with this conical surface 18 mating with a constriction 19 formed by the shoulder 20 of a metallic casing 21. The closed end 12 of the solid electrolyte tube 11 thus projects freely into the tubular stub 22 of the casing 21 that is open at its front end and has a few openings 23 punched or sheared in its walls.

The casing 21, that may be made of ordinary steel and in the illustrated example is in the form of a simple insertion piece to be mounted through the wall of an exhaust pipe, is provided with a flange 24 to facilitate its mounting. The insertion body portion 25 that extends from the flange 24 to the shoulder 20 of the casing 21 forms an intermediate cavity 26 between itself and the solid electrolyte tube 11. The cavity 26 is filled with a powdery sealing material 27 consisting of graphite. The graphite filling contained from below by the shoulder 20 is compressed by a metal ring 28, the inner surface of which has some clearance between it and the solid electrolyte tube 11. After the metal ring 28 is pressed into place, it is fastened to the casing 21 by a spot weld 29. The graphite 27 connects the platinum layer serving as the outer electrode 16 of the solid electrolyte tube 11 electrically to the casing 21, and also acts as a yielding buffer mass when subjected to forces arising from thermal expansion or contraction of the solid electrolyte tube 11 or of the casing 21. The graphite 27 also provides a gas-tight connection between the solid electrolyte tube 11 and the casing 21. Such a gas-tight junction of the two parts is important, because any exhaust gases penetrating into the longitudinal bore 15 of the solid electrolyte tube 11 would lead to a change of the oxygen partial pressure at the inner electrode 17, with the result that a modified potential would be measured. The sealing material 27 is pressed to a pressure of about 1000 $kg/cm^2$ by the metallic ring 28.

On the seat 30 formed between the longitudinal bore 15 and the countersunk cavity 14 is seated the flange 31 of a tubular connection member 32, the free end of which is provided with a connection terminal 33 for electrical connection and is also provided with a hole 34 punched or sheared in the wall to permit access of atmospheric oxygen to the inner electrode. A seal between the connection member 32 and the walls of the cavity 14, as well as the electrical contact between the connection member 32 and the inner electrode 17 provided in the form of a conducting path or layer, is produced by an electrically conducting fused glass material 35 that is pressed together and bounded by a metallic ring 36.

The seal provided by the electrically conducting glass material 35 may be prepared in the manner described in the application of Karl-Hermann Friese, Heinz Geier, Rudolf Pollner and Heino Schallert, Serial No. 316,008, filed Dec. 18, 1972.

FIG. 2 shows an electrochemical sensor 41 which is distinguished from the sensor 10 of FIG. 1 simply in that instead of the powdery sealing material 27 consisting entirely of graphite, there is a three-layer powdery sealing material 45, 46, 47. The middle layer 46 is of copper powder that fills the space between the casing and the solid electrolyte tube in the middle portion of the seal and is enclosed above and below by a graphite layer 45 and a talc layer 47, respectively, that close off the ends of the seal. The talc layer 47 prevents or retards the oxidation of the copper powder 46, and thus favorably influences the yielding copper powder layer 46 that serves along with the graphite layer 45 to establish the necessary electrical contact.

Although the invention has been described with respect to particular embodiments, it will be understood that modifications and variations may be made within the inventive concept. For example, instead of the casing 21 made of sheet metal and providing an insertion plug portion 25 as above described, a steel casing provided with screw threads for securing the sensor in place may be used.

I claim:

1. Electrochemical sensor for determination of the oxygen content of hot gas, such as engine exhaust gas, comprising:

a tube (11) of solid electrolyte closed at one end;
electron conducting layers, one on the inner surface and one on the outer surface of said tube, forming inner and outer electrodes respectively;
a connection member (32) electrically connected to said inner electrode and of a form of construction such as to admit ambient air to the inner surface of said tube;
a casing (21) electrically connected to said outer electrode and surrounding the circumference of said tube over at least a major part of its length;
a first seal (35) of an electrically conducting sealing material between said connection member and said inner surface encircling said connection member;
a second seal (27) consisting of an annular mass of graphite powder between said casing and said outer surface encircling said tube, and
at least one annular pressure applying means for compressing at least said second seal, said first and second seals being stable over a range of temperature including the temperature range of the gas being examined,
said second seal (27) being of a yielding character even after compression by said pressure applying means and providing an electrical connection between said outer electrode and said casing.

2. Electrochemical sensor for determination of the oxygen content of hot gas, such as engine exhaust gas, comprising:

a tube (11) of solid electrolyte closed at one end;
electron conducting layers, one on the inner surface and one on the outer surface of said tube, forming inner and outer electrodes respectively;
a connection member (32) electrically connected to said inner electrode and of a form of construction such as to admit ambient air to the inner surface of said tube;
a casing (21) electrically connected to said outer electrode and surrounding the circumference of said tube over at least a major part of its length;
a first seal (35) of an electrically conducting sealing material between said connection member and said inner surface encircling said connection member;
a second seal (45-47) between said casing and said outer surface encircling said tube consisting of three annular layers successively adjacent to each other in the axial direction, the middle layer (46) being composed of copper powder, one layer adjacent thereto being an annular mass of graphite powder (45) and the other layer being a layer of talc powder (47), and
at least one annular pressure applying means for compressing at least said second seal, said first and second seals being stable over a range of temperature including the temperature range of the gas being examined,
said second seal (45-47) being of a yielding character even after compression by said pressure applying means and providing an electrical connection between said outer electrode and said casing.

* * * * *